(12) United States Patent
Nord et al.

(10) Patent No.: US 8,433,159 B1
(45) Date of Patent: Apr. 30, 2013

(54) COMPRESSED TARGET MOVEMENT MODEL USING INTERPOLATION

(75) Inventors: Janne Ilmari Nord, Espoo (FI); Jarkko Yrjänä Peltola, Tuusula (FI)

(73) Assignee: Varian Medical Systems International AG (CH)

( * ) Notice: Subject to any disclaimer, the term of this patent is extended or adjusted under 35 U.S.C. 154(b) by 943 days.

(21) Appl. No.: 11/804,145

(22) Filed: May 16, 2007

(51) Int. Cl.
G06K 9/32 (2006.01)
G06K 9/00 (2006.01)
H04N 7/12 (2006.01)

(52) U.S. Cl.
USPC .............. 382/300; 382/132; 375/240.16

(58) Field of Classification Search .............. 382/300
See application file for complete search history.

(56) References Cited

U.S. PATENT DOCUMENTS

| | | | |
|---|---|---|---|
| 6,373,998 B2 * | 4/2002 | Thirion et al. | 382/294 |
| 6,757,423 B1 * | 6/2004 | Amini | 382/154 |
| 6,766,063 B2 * | 7/2004 | Gonsalves | 382/261 |
| 6,900,846 B2 * | 5/2005 | Lee et al. | 348/459 |
| 7,116,808 B2 * | 10/2006 | Ditt et al. | 382/128 |
| 7,180,548 B2 * | 2/2007 | Mishima et al. | 348/441 |
| 7,352,370 B2 * | 4/2008 | Wang et al. | 345/424 |
| 7,460,699 B2 * | 12/2008 | O'Donnell et al. | 382/128 |
| 7,646,936 B2 | 1/2010 | Nord | |
| 7,756,359 B1 | 7/2010 | Nord | |
| 7,778,488 B2 | 8/2010 | Nord | |
| 2002/0196362 A1 * | 12/2002 | Yang et al. | 348/452 |
| 2005/0025244 A1 * | 2/2005 | Lee et al. | 375/240.16 |
| 2005/0053291 A1 * | 3/2005 | Mishima et al. | 382/236 |
| 2005/0261790 A1 * | 11/2005 | Park et al. | 700/94 |
| 2006/0002615 A1 * | 1/2006 | Fu et al. | 382/254 |
| 2006/0018383 A1 * | 1/2006 | Shi et al. | 375/240.16 |
| 2006/0034500 A1 * | 2/2006 | Quist et al. | 382/130 |
| 2006/0074292 A1 * | 4/2006 | Thomson et al. | 600/411 |
| 2006/0233253 A1 * | 10/2006 | Shi et al. | 375/240.16 |
| 2006/0285595 A1 * | 12/2006 | Ha et al. | 375/240.16 |
| 2007/0053431 A1 * | 3/2007 | Cammas et al. | 375/240.12 |
| 2007/0167784 A1 * | 7/2007 | Shekhar et al. | 600/443 |
| 2008/0247622 A1 * | 10/2008 | Aylward et al. | 382/131 |
| 2008/0317317 A1 * | 12/2008 | Shekhar et al. | 382/131 |
| 2009/0034819 A1 * | 2/2009 | Nord et al. | 382/132 |

OTHER PUBLICATIONS

Alankus, Animating Characeter Navigation Using Motion Graphs, A Thesis Submitted to The Graduate School of Natural and Applied Science of Middle East Technical University, Jun. 2005, pp. 1-25.*

(Continued)

Primary Examiner — David Zarka
(74) Attorney, Agent, or Firm — Vista IP Law Group, LLP (57) ABSTRACT

Systems and methods for generating a movement model that requires less storage space than movement models of the prior art are disclosed. This movement model may be based on x-ray images of a patient and may be configured for estimating movement of organs within the patient during medical treatment. The movement model comprises at least two deformation fields associated with strong time points and a plurality of interpolation parameters associated with weak time points. In contrast with the prior art, the stored movement model does not include deformation fields associated with all time points. Because interpolation parameters rather than deformation fields are associated with the weak time points, the movement model requires less storage than movement models of the prior art. The stored movement model is optionally used to calculate interpolation fields that can be used to model movement of a patient.

28 Claims, 6 Drawing Sheets

OTHER PUBLICATIONS

Schreibmann et al., Image Interpolation in 4D CT Using a B-Spline Deformable Registration Model, Int. J. Radiation Oncology Biol. Phys., vol. 64, No. 5, pp. 1537-1550, 2006.*

Rongping Zeng et al, "Estimating 3-D Respiratory Motion from Orbiting Views by Tomographic Image Registration," IEEE Transactions on Medical Imaging, IEEE Service Center, Piscataway, NJ, US, vol. 26, No. 2, Feb. 1, 2007, pp. 153-163, XP011161757, ISSN: 0278-0062.

Rongping Zeng et al, "Respiratory Motion Estimation from Slowly Rotating X-Ray Projections: Theory and Simulation," Medical Physics, AIP, Melville, NY, US, vol. 32, No. 4, Mar. 18, 2005, pp. 984-991, XPO12075320, ISSN: 0094-2405.

Hawkes, D J et al, "Motion and Biomechanical Models for Image-Guided Interventions," Biomedical Imaging: From Nano to Macro, 2007, ISBI 2007, 4th IEEE International Symposium on, IEEE, PI, Apr. 1, 2007, pp. 992-995, ZXP031084443, ISBN: 978-1-4244-0671-5.

* cited by examiner

COMPRESSED TARGET MOVEMENT MODEL USING INTERPOLATION

BACKGROUND

1. Field of the Invention

The present invention is generally related to x-ray imaging and more specifically to reduction of data included within a movement model based thereon.

2. Related Art

To prepare a radiation treatment plan for a patient, a physician may use a model representative of movement of a portion of the patient's body. This model is referred to as a movement model and is commonly used to target diseased areas during treatment. For example, in radiation therapy for treatment of lung cancer, respiratory movement of the patient during therapy can be accounted for using a movement model. This may improve the efficacy of the treatment.

To develop a movement model, a series of x-ray images are generated, each x-ray image being associated with a different time point. From these x-ray images, a series of deformation fields are calculated to describe the movement of points within the patient. This series of deformation fields is an example of a movement model. Methods of using these deformation fields to approximate positions of a patient's organs over a period of time are known in the art.

Figure 1:
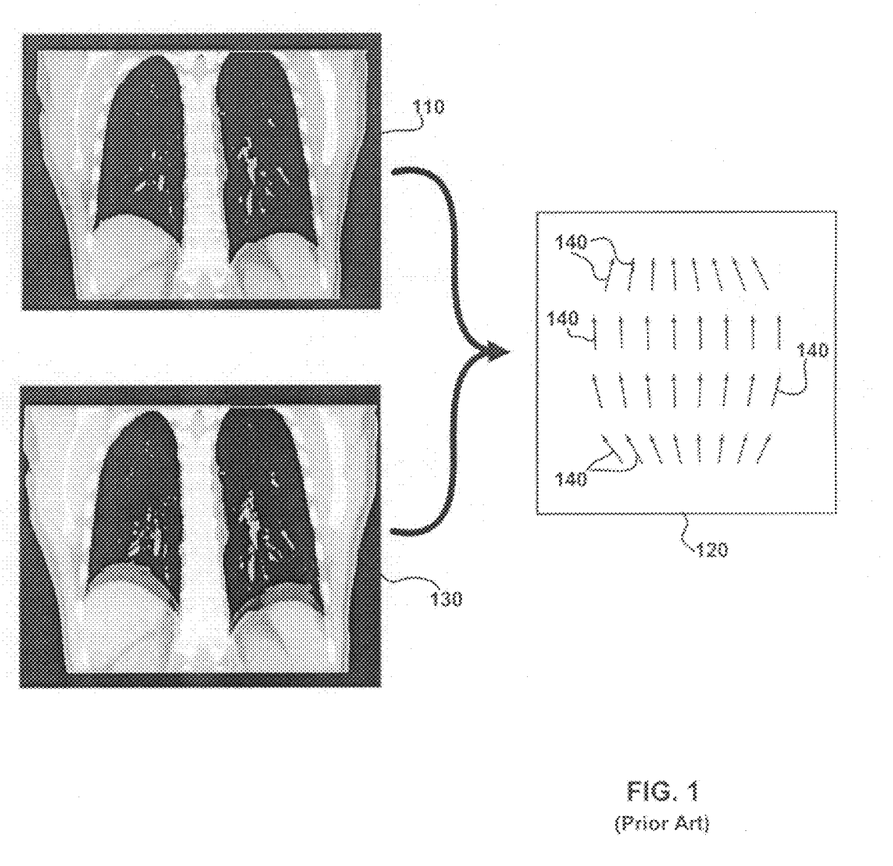
FIG. 1 illustrates the generation of a deformation field from a plurality of x-ray images.

FIG. 1 illustrates a deformation field 120 generated from two x-ray images, 110 and 130 respectfully. X-ray images 110 and 130 are images of a chest recorded at two different time points. X-ray image 110 is slightly different than x-ray image 130 because the chest has expanded upward and outward slightly between the two different time points. Deformation field 120 is calculated based on x-ray images 110 and 130 using an image registration system and represents movement of imaged objects between the x-ray images. Such image registration systems are well known in the art. Deformation field 120 can be considered to be associated with one of the time points at which the x-ray images 110 and 130 were generated.

Deformation field 120 includes a plurality of vectors 140 representative of changes between x-ray images 110 and 130. These vectors may be two or three dimensional. While FIG. 1 illustrates thirty-two 2-dimentional vectors 140, in practice deformation field 120 can include a 3-dimensional vector for each pair of corresponding pixels in the x-ray images 110 and 130. For example, if x-ray images 110 and 130 each include 500 by 500 by 100 pixels, then deformation field 120 will include 500×500×100=25,000,000 vectors. Each of these vectors may be represented by up to twenty-four bytes of data. Therefore, each deformation field can require over 500 MB (megabytes) of storage.

A movement model may include ten or more deformation fields each requiring 500 MB of storage. In that case, a movement model including 10 deformation fields would require 500×10=5000 MB of storage. Storage of this movement model requires a large amount of memory. This is particularly a problem in clinical environments where thousands of movement models relating to different patients may be stored. There is, therefore, a need for a reduction in the large storage requirements of movement models.

SUMMARY

Various embodiments of the invention include a movement model configured to represent the movement of a target over a period of time. The movement model comprises a first plurality of deformation fields associated with two or more time points classified as strong time points, and a plurality of interpolation parameters associated with two or more time points classified as weak time points. As is described further herein, a lesser quantity of information is stored for the weak time points relative to the strong time points. This reduces the memory required to store the movement model relative to systems and methods of the prior art.

Each deformation field is typically associated with a different time point and is typically calculated based on a plurality of static x-ray images of the target using an image registration system. The deformation fields comprise a plurality of vectors used to represent the movement of the target at a particular point in time. These vectors represent movement of individual pixels and/or regions in an x-ray image. For example, in some embodiments the deformation fields include a vector for each pixel of an x-ray image.

For each time point, the vectors comprising the deformation field may be used to generate a single collective movement vector. As is further described herein, the collective movement vectors at strong time points may be used in combination with the interpolation parameters associated with the weak time points to approximate movement at the weak time points.

When stored, the movement model comprises the deformation fields associated with the strong time points and the interpolation parameters associated with the weak time points. Because a deformation field associated with each of the weak time points does not need to be stored, the movement model requires less storage than movement models of the prior art.

In some embodiments, the stored movement model is later used to model movement of a target. When this occurs, the interpolation parameters are used to generate approximations of deformation fields associated with the weak time points. These approximations are referred to herein as interpolated deformation fields. The interpolated deformation fields may be used to model movement within a patient's body over a period of time using methods similar to those known in the prior art. However, in contrast with the prior art, the interpolated deformation fields are used in place of deformation fields generated from x-ray images.

To create the movement model, the strong time points may be selected in a variety of ways. For example, in some embodiments the time points at extremes of movement are selected. In some embodiments more than one different combination of time points are classified as strong time points and the combination resulting in the smallest amount of approximation error is ultimately selected to characterize the movement model. In other embodiments a second derivative associated with a movement model may be calculated and the time points near times where the second derivative is zero are classified as strong time points. In some embodiments the time points associated with x-ray images having a least amount of noise are selected as the strong time points.

Various embodiments of the invention include a method comprising calculating deformation fields based on a plurality of x-ray images of a target, the x-ray images generated at different time points, the deformation fields representing a movement of the target at the time points, selecting a first and a second of the deformation fields, the selection being based on the plurality of collective movement vectors, and calculating an interpolation parameter associated with at least a third deformation field of the deformation fields, the interpolation parameter being configured for calculating an interpolated deformation field using the selected first and second of the deformation fields.

Various embodiments of the invention include a method comprising receiving a plurality of deformation fields, each deformation field being based on at least one x-ray image of a target generated at one of a plurality of time points, for each of the plurality of deformation fields, calculating a collective movement vector, selecting two or more of the plurality of the time points as strong time points and designating others of the plurality of the time points as weak time points, a movement model comprising a) those deformation fields associated with the strong time points, and b) interpolation parameters based on those deformation fields associated with each of the weak time points.

Various embodiments of the invention include a system comprising an evaluation module configured to select two or more strong time points each associated with one of two or more deformation fields, an interpolation module configured to calculate interpolation parameters based on the two or more selected strong time points, each of the interpolation parameters being associated with a different one of the deformation fields, and a storage module configured to store a movement model comprising the interpolation parameters and the deformation fields associated with the two or more strong time points.

Various embodiments of the invention include a computer readable medium having stored thereupon a movement model comprising a plurality of deformation fields generated using x-ray images of a target, the x-ray images generated at strong time points, and a plurality of interpolation parameters calculated using the plurality of deformation fields and configured for calculating a plurality of interpolated deformation fields, the interpolated deformation fields being configured for generating an approximation of the plurality of deformation fields.

Various embodiments of the invention include a method comprising receiving a movement model comprising first deformation fields generated using x-ray images of a target and of interpolation parameters, the interpolation parameters being generated based on second deformation fields, calculating interpolated deformation fields using the received movement model, and using the interpolated deformation fields to model movement of a target.

DETAILED DESCRIPTION

Various embodiments of the invention include systems and methods of determining and storing a movement model configured to represent movement of a target over time. The target may comprise a moving internal body part, such as a heart or a lung, captured using a series of x-ray images. The series of x-ray images may be captured throughout a cycle, such as a respiratory cycle, at multiple sequential time points. The data included in the movement model enables re-creation of the movement of the target data and is optionally used to calculate a semi-continuous series of target positions. These positions are optionally used to provide treatment to a patient.

Some embodiments of the invention comprise a movement model engine configured for calculating a movement model. Some embodiments of the invention include a simulation module configured for using the calculated movement model to generate interpolated deformation fields that can be used to model movement within the target. Some embodiments of the invention include a movement model stored on a computer readable medium.

Some embodiments of the invention include an image registration system configured to generate deformation fields from x-ray images, and some embodiments of the invention are configured to make use of deformation fields generated using registration systems of the prior art.

Figure 2:
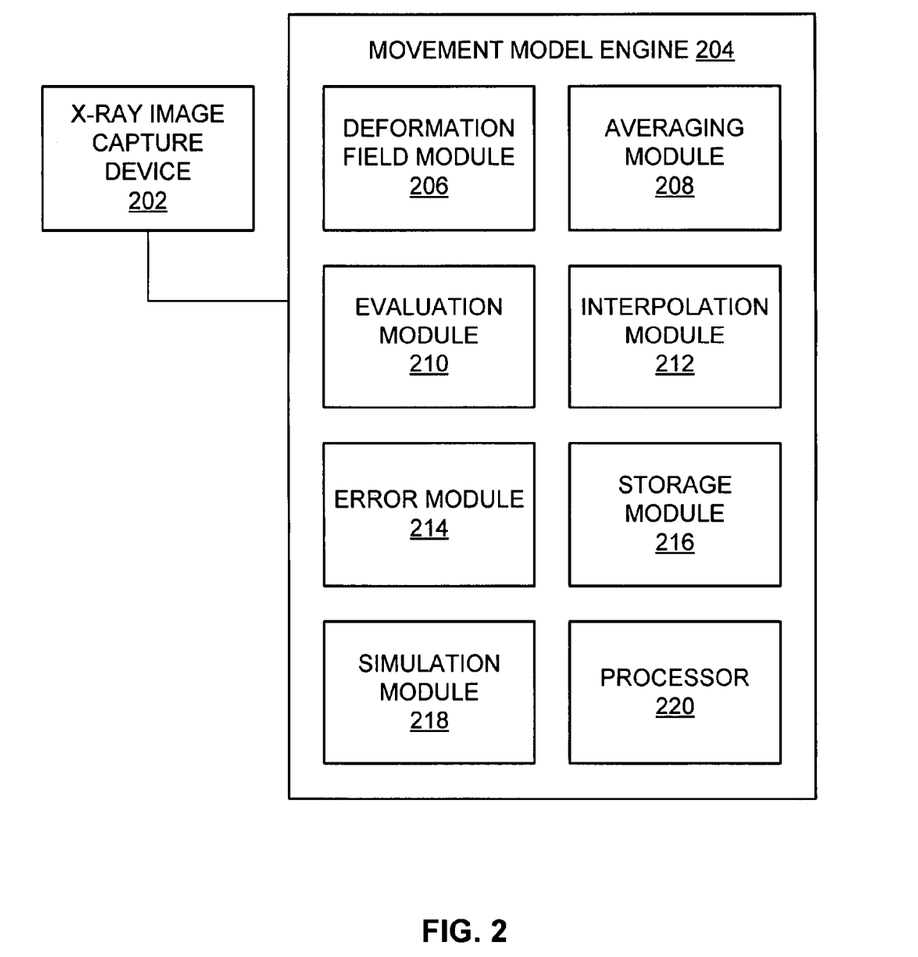
FIG. 2 is a block diagram of an exemplary movement model engine according to various embodiments.

FIG. 2 is a block diagram of an exemplary movement model engine 204, according to various embodiments. The movement model engine 204 may comprise a deformation field module 206, an averaging module 208, an evaluation module 210, an interpolation module 212, an error module 214, a storage module 216, a simulation module 218, and/or a processor 220. In some embodiments the simulation module 218 is embodied on a device separate from the other modules. In various embodiments the modules included in the movement model engine may be embodied in firmware, hardware, and/or software (stored on a computer readable media) executable by the processor 220.

An optional x-ray image capture device 202 is configured to capture a plurality of x-ray images of a target. The x-ray image capture device 202 may alternatively be separate from or integrated into the movement model engine 204. Each of the plurality of x-ray images is associated with a time point. A time point is a particular point in time at which an x-ray image of the target is captured. The time point may be expressed as a timestamp, a time relative to an earlier or later point in time, a time of day, and/or the like. In various embodiments the plurality of x-ray images includes at least 10, 50, 100 or 200 x-ray images.

The deformation field module 206 is optional and is configured to calculate a deformation field associated with each of the x-ray images. This deformation field can be calculated using an image registration algorithm, for example the demons algorithm. A deformation field, as used herein, comprises a set of vectors representative of changes (e.g., movement) between at least one x-ray image and a subsequent x-ray image of the target. Each vector may be representative of the movement of a pixel or a group of pixels. In various embodiments the deformation field comprises a matrix of approximately 100×100×50, 256×256×100, or 512×512×150 vectors, or the like. In alternative embodiments the deformation field module 206 is configured to receive deformation fields as input from an outside source such as the x-ray image capture device 202.

The averaging module 208 is configured to calculate a collective movement vector for each of the deformation fields. The collective movement vector is a vector calculated so as to represent the plurality of vectors of the deformation field as a single vector. For example, in various embodiments the collective movement vector is calculated by taking a mean or median of the vectors in a deformation field. The collective movement vector may represent the movement of a center of mass of the target between x-ray images. The collective movement vector can have a dimensionality that is different than that of the deformation field. For example, if the deformation field consists of 3-dimensional (x, y, z) vectors related to the coordinates of the pixels, the collective movement vector can present the median of those 3-dimensional vectors and the average curl of the deformation vector field, making it a 6-dimensional vector. Each of the collective movement vectors is typically associated with at least one of the x-ray images and at least one of the time points.

In some embodiments the deformation field module 206 and/or the averaging module 208 is configured to select a portion of the deformation fields corresponding to a specific region in the target. This portion may be given a greater or lesser weight, relative to other portions, in the calculations made by the deformation field module 206 and/or the averaging module 208. For example, in x-ray images of the lungs, other objects such as the rib cage or spine may be present. As the movement of the lungs may have a higher priority in some treatments, the regions corresponding to the other objects may be given a lesser weight in the calculation of the collective movement vector.

The evaluation module 210 is configured to select two or more of the time points as strong time points. As is further described herein, the evaluation module 210 may use one or more techniques, singly or in combination, to select the strong time points. For example, the time points wherein the collective movement vectors change the most in magnitude and/or direction may be selected as strong time points. For example, in a breathing cycle, a first strong time point may occur at the point in time at which the patient switches from inhaling to exhaling. A second strong time point may selected as the time when the patient ceases exhaling and begins inhaling.

In some embodiments the strong time points are selected by searching for a combination of time points that yields a smallest error in the approximation of the movement of the target. In these embodiments several different combinations of time points are tested and the accuracies of using each combination to approximate the movement are compared. For example, the evaluation module 210 may first test a first combination of two strong time points. The test includes using this first combination of strong time points to generate a first movement model configured to represent the actual movement in the x-ray images. This first movement model includes deformation fields associated with the two strong time points and interpolation parameters associated with weak time points. The first movement model is then used to calculate interpolated deformation fields. These interpolated deformation fields are discussed further elsewhere herein and are intended to approximate those deformation fields not included in the first movement model, e.g. the deformation fields associated with the weak time points. A first error associated with the first combination is then calculated by comparing the interpolated deformation fields and the corresponding deformation fields generated directly from the x-ray images. This first error is representative of the accuracy of using the first combination of strong points to represent the actual movement of the target.

The evaluation module 210 may then test a second different combination of two strong time points, and in a similar manner calculate a second error associated with the second combination. The evaluation module 210 then compares the first error to the second error, and selects the combination of strong time points yielding the smallest error. As is described further herein, this process can be repeated iteratively in order to identify a movement model having an error below a predetermined value. While the above example includes two strong time points in each of the first and second combination, the first and second combination of strong time points may include different numbers of strong time points. For example, in alternative embodiments, the second combination includes three or more strong time points.

In some embodiments the strong time points are selected based on measurements made while the x-ray images are captured. For example, the movement of a marker placed on a patient can be measured while x-ray images are captured. Movement of the marker is detected by an external device such as a camera, or by the position of the marker within the x-ray images. The strong time points can then be selected based on the movement of this marker. For example, time points at which the measured movement is at its extremes can be selected as strong time points.

In some embodiments the strong time points may be selected by calculating a first and/or second derivative representative of a change in the collective movement vectors over time. The first and/or second derivative may be used to identify time points at which movement of the target changed direction.

In some embodiments the evaluation module 210 is configured to determine an amount of noise within an x-ray image. This noise may include movements and/or measurements caused by activity other than the natural movement of the target. For example, noise in a cardiac image may be caused by the entire patient moving during the image acquisition process. Noise may also include image artifacts generated by imperfections in the x-ray image generation process. Noise can be detected by looking the error as described in elsewhere herein. For example, if the error is larger than some threshold value, the time point can be characterized as having a noisy image. In another example, if the error value differs too much from a linear interpolation of the error values of the neighboring time points, then this time point can be detected as noisy. In the selection of strong time points, evaluation module 210 is optionally configured to give preference to those time points associated with x-ray images including minimal noise. Likewise, evaluation module 210 is optionally configured to avoid selecting as strong time points the time points associated with x-ray images including significant noise.

In some embodiments movement of the target, as represented by the collective movement vectors, is determined and the time points associated with positions of the target having the greatest separation are selected as strong time points. The movement of the target may be determined by adding the cumulative effect of the collective movement vectors together as a function of time. Typically, the greatest separation will occur at time points where the collective movement vectors change direction.

The evaluation module 210 is configured to designate as weak time points the remaining time points not selected as strong time points.

The interpolation module 212 is optional and is configured to determine interpolation parameters associated with the weak time points. These interpolation parameters are stored as part of the movement model and can be used to approximate the collective movement vectors and/or interpolated deformation fields associated with the weak time points. As is further described herein, these interpolation parameters are used as weighting factors to weight the contribution of information associated with strong time points to the approximations of collective movement vectors and/or deformation fields associated with the weak time points.

The interpolation parameter typically comprises a scalar value, which can be calculated using a variety of techniques. For example, in some embodiments the scalar value is calculated by comparing the collective movement vector associated with a weak time point to the collective movement vectors associated with neighboring strong time points. This comparison can be made using the formula:

$$\frac{V_w - V_{S2}}{V_{S1} - V_{S2}} = \alpha$$

where $V_w$ is the collective movement vector at the weak time point, $V_{S1}$ is the collective movement vector at a first neighboring strong time point, $V_{S2}$ is the collective movement vector at a second neighboring strong time point, and $\alpha$ is the scalar value. In alternative embodiments the variables $V_w$, $V_{S1}$, and $V_{S2}$ represent individual vectors within the respective deformation fields and a value of $\alpha$ is calculated for each set of vectors. These values of $\alpha$ are then averaged to determine the interpolation parameter.

In alternative embodiments interpolation parameters are calculated using a line search algorithm, spline interpolation, linear interpolation, or the like. In alternative embodiments the interpolation parameter includes a vector rather than a scalar value. In these embodiments the interpolation parameter can be represented by scalar component values, $a_x$, $a_y$ and $a_z$ associated with each unit vector.

In various embodiments the interpolation parameter is used to calculate an interpolated deformation field by calculating a weighted average between the deformation fields associated with the previous strong time point and the next strong time point. The interpolated deformation field at a weak time point can be calculated as:

$$D_{interpolated} = \alpha * D_{previous} + (1-\alpha) * D_{next}$$

where $D_{interpolated}$ is the interpolated deformation field, $\alpha$ is the interpolation parameter, $D_{previous}$ is the deformation field associated with the previous strong time point, and $D_{next}$ is the deformation field associated with the next strong time point.

The error module 214 is optional and is configured to measure an amount of error associated with the use of interpolation parameters to calculate interpolation deformation fields at the weak time points. For example, in some embodiments error module 214 is configured to calculate the error between the interpolated deformation fields and the original deformation fields calculated from the x-ray images at the weak time points. The error for a particular weak time point can be calculated as:

$$d = f(|D_{original} - D_{interpolated}|)$$

where d is the difference, $D_{original}$ is the original deformation field, and $D_{interpolated}$ is the interpolated deformation field. The function $f()$ can include taking a mean, median, sum, or the like. In alternative embodiments $D_{original}$ and $D_{interpolated}$ are interpolated collective movement vectors calculated from the original deformation field. The error module 214 may be configured to present the difference as a volume integrated histogram. The total error is typically the sum of differences calculated for each weak time point.

The error module 214 is further configured to compare the difference, d, and/or the total error to some acceptance criteria. This acceptance criteria optionally includes a predetermined maximum allowable difference or total error. If the acceptance criteria are not met, a weak time point may be selected as a new strong time point, as described in connection with the evaluation module 210. If a plurality of the interpolated deformation fields does not meet the acceptance criteria, the weak time point associated with the largest difference, d, is optionally selected to be a strong time point. In one embodiment, the acceptance criteria may be in the form of a volume of less than x cm³ must be associated with a difference d no larger than y mm. In some embodiments the difference, d, may be smoothed using the following function:

$$F_{x,y}(k) = (k-x)^2, k > x;$$

0, otherwise where k is the total volume of regions associated with a difference, d, larger than y. In other embodiments the smooth measure of the difference, d, may be expressed as a weighted sum comprising multiple functions associated with a weighting factor.

The storage module 216 is configured to store the data, e.g., deformation fields and interpolation parameters, associated with the time points as a movement model. The stored movement model comprises two or more deformation fields associated with strong time points and a plurality of interpolation parameters associated with weak time points. The movement model typically does not include deformation fields associated with the weak time points. By not including these deformation fields in the movement model, the movement model requires less memory for storage, relative to movement models of the prior art. The storage module 216 may include static memory, volatile or non-volatile memory, a hard drive, an optical drive, solid state memory, and/or the like.

Figure 3:
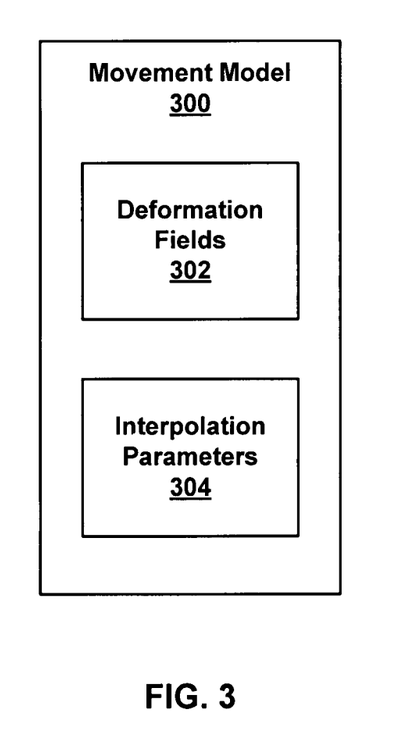
FIG. 3 is block diagram of an exemplary movement model according to various embodiments.

FIG. 3 is block diagram of an exemplary movement model 300, as may be stored in storage module 216, according to various embodiments. The exemplary movement model 300 can be generated by the movement model engine 204 and stored on computer readable media. The movement model 300 comprises deformation fields 302 and interpolation parameters 304, each of which are associated with time points. The movement model can be stored in a storage device or electronic medium comprising hardware, software, firmware, or a combination of media. The deformation fields 302 comprise the deformation fields associated with strong time points. The interpolation parameters 304 comprise the interpolation parameters associated with weak time points.

Because the interpolation parameters can be expressed as a scalar or set of scalars, they require less storage than a deformation field. The movement model 300, therefore, typically requires less storage than movement models of the prior art. For example, as discussed above, a movement model of the prior art that includes 10 deformation fields each comprising 500×500×100 vectors may require 5000 MB of storage. However, in one embodiment of the invention this same movement model may be represented by the deformation fields associated with four strong time points, each requiring 500 MB of storage and 6 interpolation parameters requiring a few hundred bytes of storage. These interpolation parameters may comprise a scalar or a vector. Together this example would require about 2000 MB of storage space. In various embodiments the amount of storage required to store a movement model is reduced by a factor of at least 2, 5 or 10 relative to the prior art in which all deformation fields are stored. Thus, the storage module 216 can be configured to store less data per movement model than storage modules configured to store movement models of the prior art. For example, the storage module 216 can be smaller in size and/or may be configured to store more movement models, or be used for other purposes.

Referring again to FIG. 2, the simulation module 218 is configured to access the movement model stored in the storage module 216 and generate a representation of the movement of the target. This representation includes deformation fields calculated from x-ray images (without the use of interpolation parameters) and associated with strong time points, and interpolated deformation fields associated with weak time points and calculated using interpolation parameters.

Together, these deformation fields and interpolated deformation fields can be used to model movement of the target using methods of the prior art.

The simulation module 218 may calculate the interpolated deformation fields by performing a linear interpolation between time points. For example, in some embodiments the simulation module 218 is configured to calculate interpolated deformation fields associated with weak time points, using the formula: $D_{interpolated} = \alpha * D_{previous} + (1-\alpha) * D_{next}$, described elsewhere herein. In some embodiments simulation module 218 is configured to calculate interpolated collective movement vectors associated with weak time points using the same formula. These interpolated deformation fields and/or interpolated collective movement vectors are approximations of the original deformation fields and/or collective movement vectors and may be used for treatment of a patient.

Optional processor 220 includes an integrated circuit, microprocessor, logic device, or the like, and may be configured to execute computing instructions included in deformation field module 206, averaging module 208, evaluation module 210, interpolation module 212, error module 214, and/or simulation module 218. Processor 220 is typically configured to read movement model 300 from storage module 216.

Figure 4:
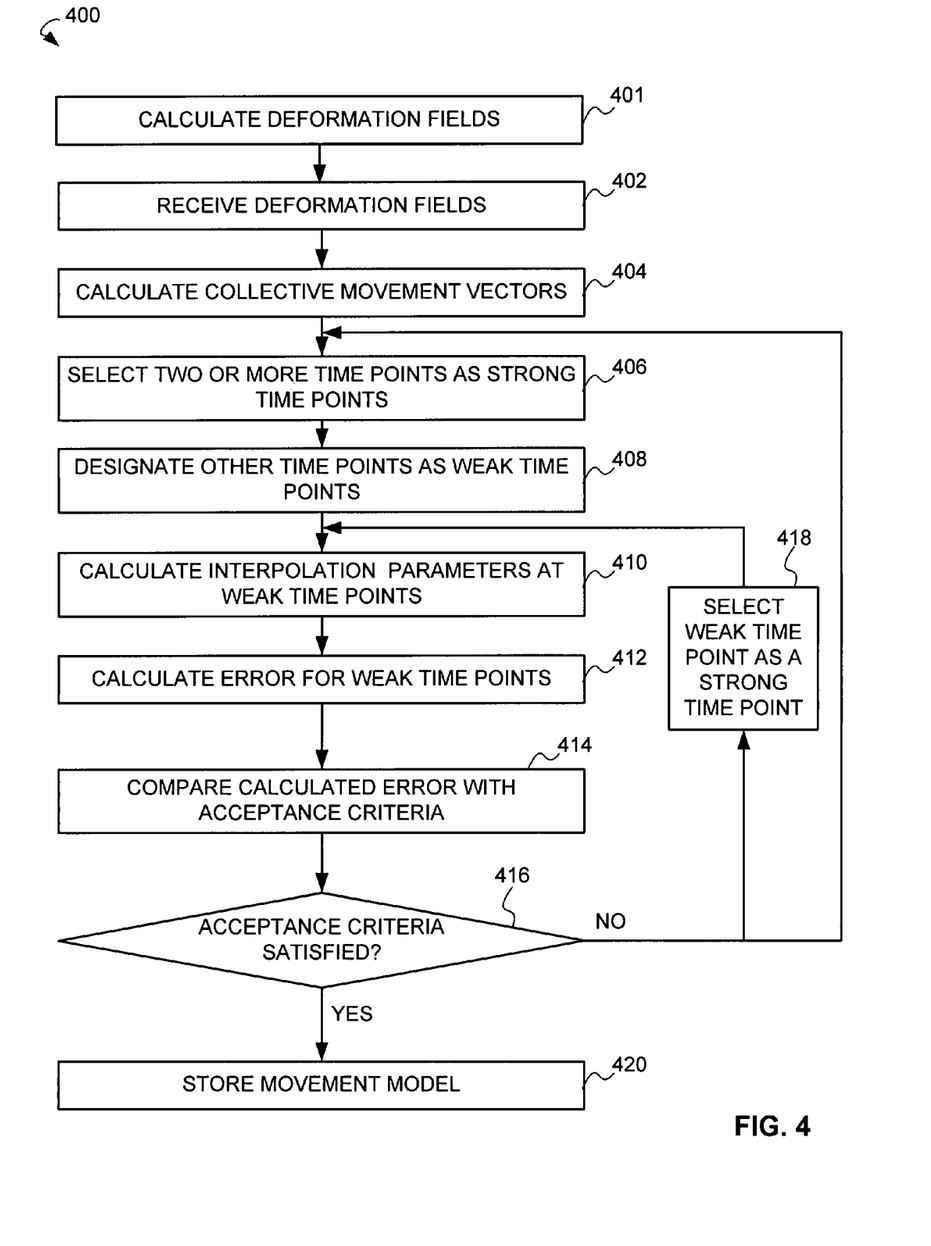
FIG. 4 is a flowchart of an exemplary process of generating a movement model according to various embodiments.

FIG. 4 includes a flowchart of an exemplary method 400 of generating a movement model according to various embodiments. The method 400 may be performed by the movement model engine 204 to generate the movement model 300.

In an optional step 401, deformation fields are generated using deformation field module 206 and x-ray images of a target. These deformation fields may be generated using methods of the prior art. Step 401 is optional when the deformation fields are generated by a separate system.

In a step 402, a set of deformation fields is received. These deformation fields are either calculated using deformation field module 206 or generated by a separate system. The deformation fields each represent movement of a target at an associated time point. The deformation fields are typically calculated using image data and an image registration process. The image data may include x-ray images generated using x-ray image capture device 202. In some embodiments the deformation fields are calculated using systems and/or methods described in co-pending U.S. patent application Ser. Nos. 11/726,884, 11/542,952 and 11/542,958, the disclosures of which are hereby incorporated herein by reference.

In a step 404, a collective movement vector is calculated for each of the deformation fields received in step 402, using averaging module 208. As is further described herein, each collective movement vector may be a mean or a median of the vectors within each deformation field. Each of the calculated collective movement vectors is associated with the same time point as the deformation field from which the collective movement vector was calculated. Typically, at least one collective movement vector is calculated for most of the time points.

In a step 406, two or more time points are selected as strong time points using evaluation module 210. As is described elsewhere herein, the strong time points may be selected based on the collective movement vectors calculated in step 404. The selection may be based on differences between the collective movement vectors, a first or second derivative, errors resulting from various combinations of strong points, movement of the target, or the like. In a step 408, the time points that were not selected to be strong time points in step 406 are designated as weak time points.

In a step 410, interpolation parameters are calculated at each of the weak time points using interpolation module 212. The interpolation parameters each comprise a scalar and/or vector value configured to represent a weighting of information (e.g., deformation fields or collective movement vectors) at strong time points as may be used to approximate interpolated deformation fields and/or interpolated collective movement vectors.

In an optional step 412, an error is calculated for each of the weak time points, using error module 214. As is further described elsewhere herein, the error may represent differences between interpolated deformation fields and/or interpolated collective movement vectors and original deformation fields and/or interpolated collective movement vectors calculated directly from the original deformation fields.

In an optional step 414, the error calculated in step 412 is compared with acceptance criteria, using error module 214. These acceptance criteria can be predetermined or variable. For example, in some embodiments the acceptance criteria changes as a function of how many times step 412 is performed.

In some embodiments, in a step 416, if the error associated with one of the weak time points does not meet the acceptance criteria, the method returns to step 406 wherein a different set of strong time points is selected. Steps 406 through 416 may be repeated in an iterative process configured to identify a set of strong time points that produce an error that satisfies the acceptance criteria.

In alternative embodiments if the error associated with one of the weak time points does not meet the acceptance criteria, this weak time point is selected to be an additional strong time point, in a step 418. The method 400 then returns to step 410 to recalculate the interpolation parameters at the remaining weak time points. Steps 410 through 418 may be repeated in an iterative process configured to identify a set of strong time points that produce errors that meet the acceptance criteria.

If the error associated with the weak time points does meet the acceptance criteria, the movement model is stored in storage module 216, in a step 420.

Figure 5:
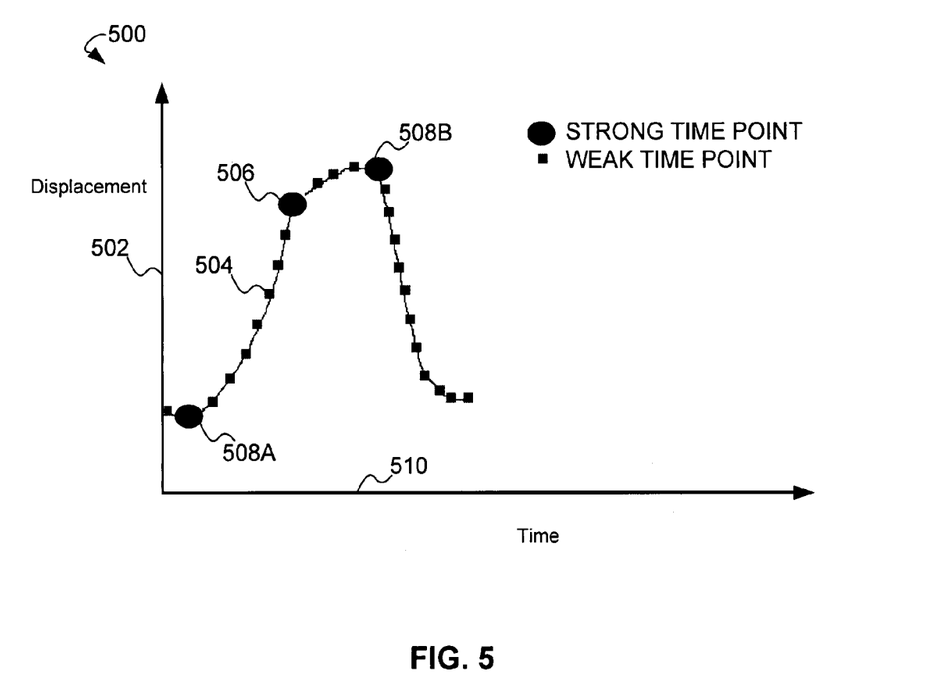
FIG. 5 is a graph depicting a respiratory movement of a patient according to one embodiment.

FIG. 5 includes a graph 500 depicting a respiratory movement of a patient according to one embodiment. The x-axis 510 represents time and the y-axis 502 represents the displacement of the movement of the patient. In this embodiment, the respiratory movement is represented using three strong time points 508A, 508B, and 506, and a plurality of weak time points 504.

The strong time points 508A and 508B are exemplary strong time points selected based on changes in direction of the collective movement vectors at these points, and/or based on extremes in the displacement of the movement. Strong time point 508A may occur, for example, at a time point at which the patient has ceased inhaling and begun exhaling while strong time point 508B occurs when a time point at which the patient has ceased exhaling and begun inhaling.

The time point 506 may be selected as a strong time point because that time point resulted in the greatest amount of error when only strong time points 508A and 508B were included in the movement model. For example, if the use of only strong time points 508A and 508B resulted in an error that did not meet acceptance criteria in step 414 of FIG. 4, then time point 506 may have been selected as an additional strong time point in step 418.

The movement model illustrated in FIG. 3 can be used to model movement of a target, for example during radiation treatment. In order to use the movement model in this manner, the interpolation parameters are used to generate interpolated deformation fields. These interpolated deformation fields can then be treated as if they were generated from x-ray images using methods of the prior art, e.g., without the used of interpolation parameters, and thus, can be used to estimate target movement using methods of the prior art.

Figure 6:
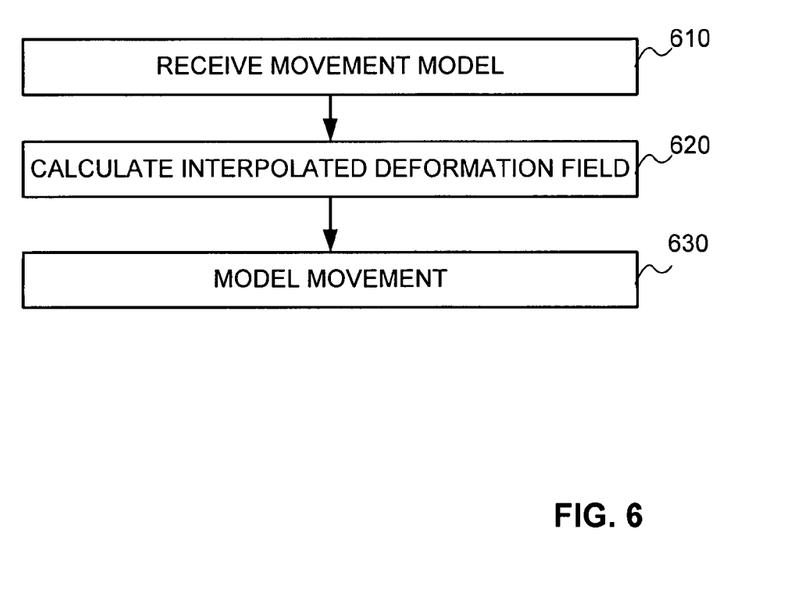
FIG. 6 illustrates methods of using the movement model of FIG. 3, according to various embodiments.

More specifically, FIG. 6 illustrates methods of using the movement model of FIG. 3, according to various embodiments. In a receive movement model step 610, the movement model is received by a simulation module, such as simulation module 218 (FIG. 2). The received movement model includes a plurality of deformation fields and at least one interpolation parameter, each associated with a time point. Typically the time point associated with the at least one interpolation parameter is between the time points associated with the plurality of deformation fields.

In a calculate interpolated deformation field step 620, the received deformation fields and interpolation parameter are used to calculate at least one interpolated deformation field. Methods of calculating an interpolated deformation field are discussed elsewhere herein.

In a model movement step 630, the calculated interpolated deformation field is used to model movement of a target. The calculated deformation field may be used in combination with the received deformation fields and/or in combination with additional calculated interpolated deformation fields. For example, the interpolated deformation field may be used to model movement of organs within a patient during radiation treatment. Methods of using deformation fields, generated from x-ray images, to model movement in a patient are known in the art. These methods can be used with the interpolated deformation fields.

Several embodiments are specially illustrated and/or described herein. However, it will be appreciated that modification and variations are covered by the above teachings and within the scope of the appended claims without departing from the spirit and intended scope thereof. For example, while respiratory movement and x-ray images are discussed herein by way of example, alternative embodiments of the invention may be used in relation to other types of movement and/or other types of images. For example, the systems and methods disclosed herein may be applied to images generated using computed tomography (CT). Images and deformation fields may be two, three or four dimensional.

In some embodiments the systems and methods of the invention are applied to separate regions of a set of deformation fields. For example, if a first region of the deformation fields represents movement of a first organ and a second region of the deformation fields represent movement of a second organ, these organs may have different movement characteristics. To represent these different movement characteristics, the methods illustrated by FIG. 4 may be applied to each of these regions separately. A resulting movement model may include a separate set of strong time points and interpolation parameters for each of the first region and second region. In various embodiments the first and second regions are selected by organ type, or using an axis of symmetry.

In some embodiments, evaluation module 210 is configured to determine interpolation parameters directly from deformation fields. For example, a set of interpolation parameters may be determined using individual displacement vectors rather than collective movement vectors. In these embodiments collective movement vectors are not required and averaging module 208 is optional.

The embodiments discussed herein are illustrative of the present invention. Ai these embodiments of the present invention are described with reference to illustrations, various modifications or adaptations of the methods or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method comprising:
    calculating deformation fields based on a plurality of x-ray images of a target, the x-ray images generated at different time points, the deformation fields representing a movement of the target at the different time points, each of the deformation fields having a plurality of vectors representative of changes in the target between two of the x-ray images;
    selecting a first deformation field associated with a first time point, and a second deformation field associated with a second time point, the first and second deformation fields selected from the calculated deformation fields; and
    determining an interpolation parameter associated with a third time point using a processor, the interpolation parameter being configured for calculating an interpolated deformation field having a plurality of vectors associated with the third time point, the interpolation parameter determined using the selected first and second deformation fields; and
    storing the interpolation parameter.

2. The method of claim 1, wherein the movement of the target comprises a respiratory movement.

3. The method of claim 1, wherein the movement of the target comprises a cardiac movement.

4. The method of claim 1, further comprising calculating the interpolated deformation field using the interpolation parameter and the selected first and second deformation fields.

5. The method of claim 1, further including calculating a plurality of collective movement vectors, each of the plurality of collective movement vectors being associated with at least one of the first and second time points and being based on the deformation field associated with that time point.

6. The method of claim 1, further including storing the first and second deformation fields and the interpolation parameter as a movement model.

7. The method of claim 1, wherein the interpolation parameter includes a scalar value determined by comparing a collective movement vector associated with one of the second time points to a collective movement vector associated with one of the first time points.

8. A method comprising:
    calculating deformation fields based on a plurality of x-ray images of a target, the x-ray images generated at different time points, the deformation fields representing a movement of the target at the time points;
    selecting a first deformation field associated with a first time point, and a second deformation field associated with a second time point, the first and second deformation fields selected from the calculated deformation fields;
    calculating an interpolation parameter associated with a third time point using a processor, the interpolation parameter being configured for calculating an interpolated deformation field associated with the third time point, the interpolation parameter calculated using the selected first and second deformation fields;

calculating a plurality of collective movement vectors, each of the plurality of collective movement vectors being associated with at least one of the first and second time points and being based on the deformation field associated with that time point;

selecting one or more regions of the calculated deformation fields, wherein calculating each collective movement vector includes a calculation based on the one or more selected regions of the deformation field associated with that collective movement vector; and storing the interpolation parameter.

9. A method comprising:

calculating deformation fields based on a plurality of x-ray images of a target, the x-ray images generated at different time points, the deformation fields representing a movement of the target at the time points;

selecting a first deformation field associated with a first time point, and a second deformation field associated with a second time point, the first and second deformation fields selected from the calculated deformation fields; and calculating an interpolation parameter associated with a third time point, the interpolation parameter being configured for calculating an interpolated deformation field associated with the third time point, the interpolation parameter calculated using the selected first and second deformation fields;

calculating the interpolated deformation field by a processor using the interpolation parameter and the selected first and second deformation fields;

calculating an error associated with the interpolated deformation field;

comparing the error to an acceptance criterion;

including a third deformation field in a movement model responsive to a result of the comparing the error to the acceptance criterion; and storing the movement model.

10. A method comprising:

receiving a plurality of deformation fields, each deformation field being based on at least one x-ray image of a target generated at one of a plurality of time points;

for each of the plurality of deformation fields, calculating a collective movement vector;

selecting two or more of the plurality of the time points as first time points, wherein others of the plurality of the time points are second time points;

calculating a movement model using a processor, the movement model comprising a) deformation fields associated with the first time points, and b) interpolation parameters associated with each of the second time points, the interpolation parameters configured for calculating interpolated deformation fields at each of the second time points; and storing the movement model.

11. The method of claim 10, further including storing the movement model.

12. The method of claim 10, wherein the received deformation fields are generated by:

receiving x-ray images, and applying an image registration algorithm to at least two of the x-ray images.

13. The method of claim 10, further comprising:

calculating errors associated with each of the interpolation parameters;

selecting a member of the second time points associated with a greatest of the calculated errors as another first time point.

14. The method of claim 10, wherein selecting the two or more members of the plurality of the time points comprises calculating a first derivative or a second derivative at a time point.

15. The method of claim 10, wherein the interpolation parameters are calculated using the plurality of collective movement vectors.

16. The method of claim 10, wherein selecting the two or more members of the plurality of time points comprises determining an amount of noise associated with a member of the plurality of deformable fields.

17. The method of claim 10, wherein the collective movement vectors represent movement associated with a center of mass of the target.

18. The method of claim 10, wherein selecting the two or more members of the plurality of the time points comprises:

determining relative positions of the target based on the plurality of the deformation fields, and selecting members of the plurality of time points associated with a greatest difference in relative positions.

19. The method of claim 10, wherein selecting the two or more members of the plurality of the time points comprises:

calculating an interpolated deformation field based on one of the interpolation parameters and at least two of the deformation fields associated with the first time points, and comparing the interpolated deformation field to a corresponding deformation field of the plurality of the deformation fields associated with a member of the second time points to determine an error value.

20. The method of claim 10, wherein selecting the two or more members of the plurality of the time points further comprises identifying a member of the second time points with a greatest error and selecting the identified member of the second time points as another first time point.

21. The method of claim 10, wherein selecting the two or more members of the plurality of the time points further comprises comparing an interpolated deformation field to a member of the plurality of deformation fields associated with one of the second time points.

22. The method of claim 10, further including generating the at least one x-ray image using a computed tomography system.

23. The method of claim 10, wherein the at least one x-ray image is a three dimensional x-ray image.

24. A method comprising:

receiving a plurality of deformation fields, each deformation field being based on at least one x-ray image of a target generated at one of a plurality of time points;

for each of the plurality of deformation fields, calculating a collective movement vector;

selecting two or more of the plurality of the time points as first time points wherein others of the plurality of the time points are second time points;

calculating movement model using a processor, the movement model comprising deformation fields associated with the first time points, and interpolation parameters associated with each of the second time points, the interpolation parameters configured for calculating interpolated deformation fields at each of the second time points; and storing the movement model;
wherein the act of selecting the two or more of the plurality of the time points comprises:
selecting a first combination comprising two or more of the plurality of the time points,
calculating a first error associated with the first combination,
selecting a second combination comprising two or more of the plurality of the time points,
calculating a second error associated with the second combination,
comparing the first error to the second error, and
selecting between the first combination and the second combination based on whether the first error is less than the second error.

25. A non-transitory computer readable medium having stored thereon instructions executable by a processor, the instructions comprising:
an evaluation module configured to select two or more time points each associated with one of two or more deformation fields;
an interpolation module configured to calculate interpolation parameters based on the two or more selected time points, each of the interpolation parameters being associated with a different one of the deformation fields; and
a storage module configured to store a movement model comprising the interpolation parameters and the deformation fields associated with the two or more time points;
wherein the instructions further comprise an error module configured to calculate an error using each of the interpolation parameters and members of the deformation fields associated with the selected time points.

26. The non-transitory computer medium of claim 25, wherein the error module is further configured to select an additional time point based on the error.

27. A method comprising:
receiving a movement model comprising first deformation fields generated using x-ray images of a target, wherein the movement model also comprises interpolation parameters, one of the interpolation parameters being generated based on second deformation fields;
calculating interpolated deformation fields by a processor using the received movement model;
using the interpolated deformation fields to model movement of a target; and
storing the movement model;
wherein one of the interpolation parameters includes a scalar value determined by comparing a first collective movement vector associated with a first time point to a second collective movement vector associated with a second time point.

28. The method of claim 27, wherein the first deformation fields are also used to model the movement of the target.

* * * * *

UNITED STATES PATENT AND TRADEMARK OFFICE
CERTIFICATE OF CORRECTION

| | | |
|---|---|---|
| PATENT NO. | : 8,433,159 B1 | Page 1 of 1 |
| APPLICATION NO. | : 11/804145 | |
| DATED | : April 30, 2013 | |
| INVENTOR(S) | : Nord et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1060 days.

Signed and Sealed this
Thirtieth Day of December, 2014

Michelle K. Lee
*Deputy Director of the United States Patent and Trademark Office*